United States Patent
Son et al.

(10) Patent No.: US 12,407,924 B2
(45) Date of Patent: Sep. 2, 2025

(54) ELECTRONIC DEVICE INCLUDING CAMERA FOR OBTAINING DIFFERENT IMAGE DATA FROM A PLURALITY OF IMAGE SENSORS USING AN OPTICAL SPLITTER

(71) Applicant: SAMSUNG ELECTRONICS CO., LTD., Suwon-si (KR)

(72) Inventors: Youngbae Son, Suwon-si (KR); Min Heu, Suwon-si (KR); Kwangseok Byon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 401 days.

(21) Appl. No.: 17/747,719

(22) Filed: May 18, 2022

(65) Prior Publication Data

US 2022/0377246 A1   Nov. 24, 2022

Related U.S. Application Data

(63) Continuation of application No. PCT/KR2022/007034, filed on May 17, 2022.

(30) Foreign Application Priority Data

May 18, 2021 (KR) .......................... 10-2021-0064330

(51) Int. Cl.
*H04N 5/335* (2011.01)
*H04N 23/54* (2023.01)
(Continued)

(52) U.S. Cl.
CPC ........... *H04N 23/672* (2023.01); *H04N 23/54* (2023.01); *H04N 23/55* (2023.01); *H04N 23/80* (2023.01)

(58) Field of Classification Search
CPC .................................................... H04N 23/672
See application file for complete search history.

(56) References Cited

U.S. PATENT DOCUMENTS

| | | | | |
|---|---|---|---|---|
| 4,876,591 A | * | 10/1989 | Muramatsu | .......... H04N 23/843 |
| | | | | 348/E9.01 |
| 8,134,618 B2 | * | 3/2012 | Ajito | .................... H04N 25/134 |
| | | | | 348/222.1 |

(Continued)

FOREIGN PATENT DOCUMENTS

| | | |
|---|---|---|
| CN | 105049698 A | 11/2015 |
| JP | 6-261328 A | 9/1994 |

(Continued)

OTHER PUBLICATIONS

International Search Report (PCT/ISA/210) dated Aug. 23, 2022 issued by the International Searching Authority in International Application No. PCT/KR2022/007034.

(Continued)

*Primary Examiner* — Gary C Vieaux
(74) *Attorney, Agent, or Firm* — Sughrue Mion, PLLC

(57) ABSTRACT

An electronic device according to an embodiment includes a camera module, a memory, and a processor. The camera module includes a lens part, a first image sensor, a second image sensor, and an optical splitter. The optical splitter provides a first portion of light introduced through the lens part to the first image sensor and provides a second portion of the light introduced through the lens part to the second image sensor. The processor combines first image data obtained based on the first image sensor and second image data obtained based on the second image sensor to generate third image data and performs a specified function.

17 Claims, 9 Drawing Sheets

(51) Int. Cl.
*H04N 23/55* (2023.01)
*H04N 23/67* (2023.01)
*H04N 23/80* (2023.01)

(56) References Cited

U.S. PATENT DOCUMENTS

| | | | |
|---|---|---|---|
| 10,404,952 B2 | 9/2019 | Yoon et al. | |
| 10,616,536 B2* | 4/2020 | Kane | H04N 23/16 |
| 10,874,293 B2 | 12/2020 | Kato | |
| 10,921,552 B1 | 2/2021 | Park et al. | |
| 11,009,830 B2 | 5/2021 | Lee et al. | |
| 2002/0140822 A1* | 10/2002 | Kahn | H04N 5/33 |
| | | | 348/207.99 |
| 2008/0030611 A1* | 2/2008 | Jenkins | H04N 23/84 |
| | | | 348/336 |
| 2010/0073499 A1* | 3/2010 | Gere | H04N 23/15 |
| | | | 348/222.1 |
| 2016/0198141 A1* | 7/2016 | Fettig | H04N 25/709 |
| | | | 348/46 |
| 2017/0026622 A1 | 1/2017 | Yoon et al. | |
| 2017/0251912 A1 | 9/2017 | Kato | |
| 2017/0272642 A1* | 9/2017 | Zhang | H04N 25/702 |
| 2018/0307181 A1 | 10/2018 | Lee et al. | |
| 2019/0222813 A1 | 7/2019 | Kane et al. | |
| 2021/0137369 A1* | 5/2021 | Meester | A61B 1/0646 |
| 2021/0368080 A1* | 11/2021 | Bachar | G02B 13/0045 |
| 2022/0407998 A1 | 12/2022 | Bachar et al. | |
| 2023/0336848 A1 | 10/2023 | Bachar et al. | |

FOREIGN PATENT DOCUMENTS

| | | |
|---|---|---|
| JP | 2003-295044 A | 10/2003 |
| JP | WO2016/117049 A1 | 7/2016 |
| KR | 1020160104236 A | 9/2016 |
| KR | 10-2017-0011818 A | 2/2017 |
| KR | 1020180119428 A | 11/2018 |
| KR | 102090625 B1 | 3/2020 |
| KR | 102252088 B1 | 5/2021 |
| WO | 2020030989 A1 | 2/2020 |

OTHER PUBLICATIONS

Communication issued Apr. 29, 2025 by the Korean Intellectual Property Office in Korean Patent Application No. 10-2021-0064330.

* cited by examiner

ELECTRONIC DEVICE INCLUDING CAMERA FOR OBTAINING DIFFERENT IMAGE DATA FROM A PLURALITY OF IMAGE SENSORS USING AN OPTICAL SPLITTER

CROSS-REFERENCE TO RELATED APPLICATION(S)

This application is a by-pass continuation application of International Application No. PCT/KR2022/007034, filed on May 17, 2022, which claims priority from Korean Patent Application No. 10-2021-0064330, filed on May 18, 2021, in the Korean Intellectual Property Office, the disclosures of which are herein incorporated by reference in their entireties.

BACKGROUND

1. Technical Field

Various embodiments disclosed in the disclosure relate to an electronic device including a camera.

2. Description of the Related Art

An electronic device may include a camera module (or a camera or a camera device) and may capture a photo or a moving image using the camera module. Recently, an electronic device including a folded camera module has been introduced to reduce a thickness of the camera module.

The folded camera module may include a prism which operates as a reflection mirror for changing a progress direction of light therein. Light incident from the outside may be changed in direction through the prism and may be delivered to an image sensor.

An electronic device may include a camera module including an image sensor. In this case, restrictions on a size or a resolution of the image sensor may occur according to optical specifications (e.g., an aperture value and an angle of view). Recently, an electronic device may include an image sensor in which two photo diodes (hereinafter, 2PD) are arranged in one pixel (hereinafter, a 2PD image sensor) to perform precise auto focus (AF). The electronic device may perform phase detection auto focus (PDAF) using the 2PD image sensor. A single pixel of the 2PD image sensor may be larger in size than a single pixel of an image sensor which does not have a 2PD scheme. Due to this, there is a problem that it is difficult to implement a higher pixel density in the same area than a general image sensor.

Various embodiments may provide an electronic device for obtaining different image data from a plurality of image sensors using an optical splitter.

SUMMARY

In accordance with an aspect of the disclosure, an electronic device is provided. The electronic device may include a camera module, a memory, and a processor electrically connected with the camera module and the memory. The camera module may include a lens part, a first image sensor including a plurality of pixels corresponding to a first color and a second color, each pixel of the plurality of pixels including two photo diodes; a second image sensor having a pixel of a third color; and an optical splitter. The optical splitter may provide a first portion of a light introduced through the lens part to the first image sensor; and provide a second portion of the light introduced through the lens part to the second image sensor. The processor may combine first image data obtained based on the first image sensor and second image data obtained based on the second image sensor to generate third image data and may perform a specified function using at least one of the first image data, the second image data, or the generated third image data.

The electronic device according to various embodiments of the disclosure may separate an image signal of a single color (e.g., green) from an image signal of a plurality of colors (e.g., red and blue), using an optical splitter (e.g., a beam splitter), and may synthesize them in various manners. As a result, the electronic device may perform precise auto focus (AF) without deterioration in resolution.

The electronic device according to various embodiments of the disclosure may separate an image signal of a single color (e.g., green) from an image signal of a plurality of colors (e.g., red and blue), thus increasing sensitivity of a single color sensor (a green channel) and enhancing low illumination performance.

DESCRIPTION OF THE DRAWINGS

The above and/or other aspects will become apparent and more readily appreciated from the following description of example embodiments, taken in conjunction with the accompanying drawings in which.

DETAILED DESCRIPTION

Hereinafter, various embodiments of the disclosure are described with reference to the accompanying drawings. Accordingly, those of ordinary skill in the art will recognize that modification, equivalent, and/or alternative on the various embodiments described herein can be variously made without departing from the scope and spirit of the disclosure. With regard to description of drawings, similar denotations may be used for similar components.

Figure 1:
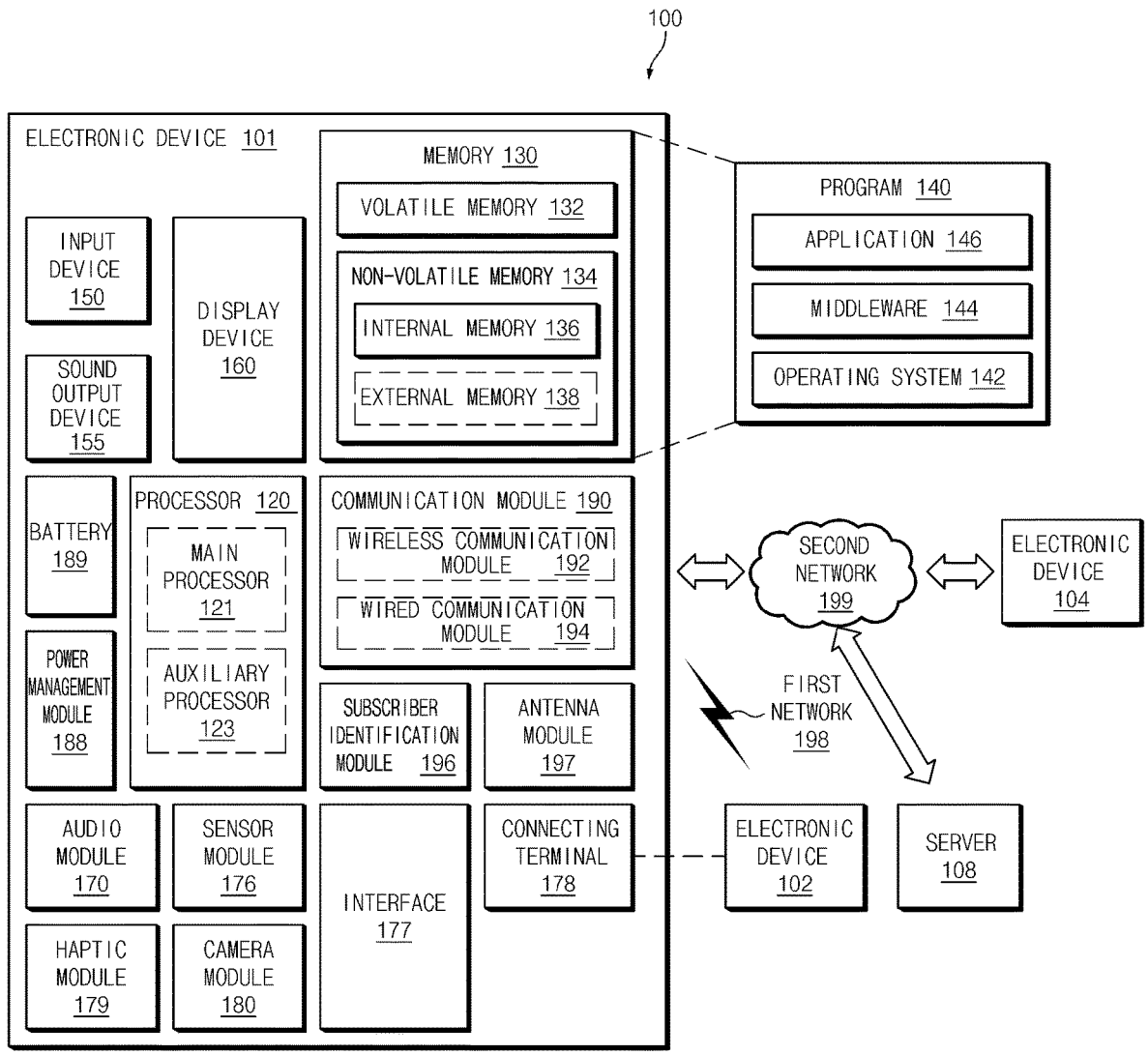
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
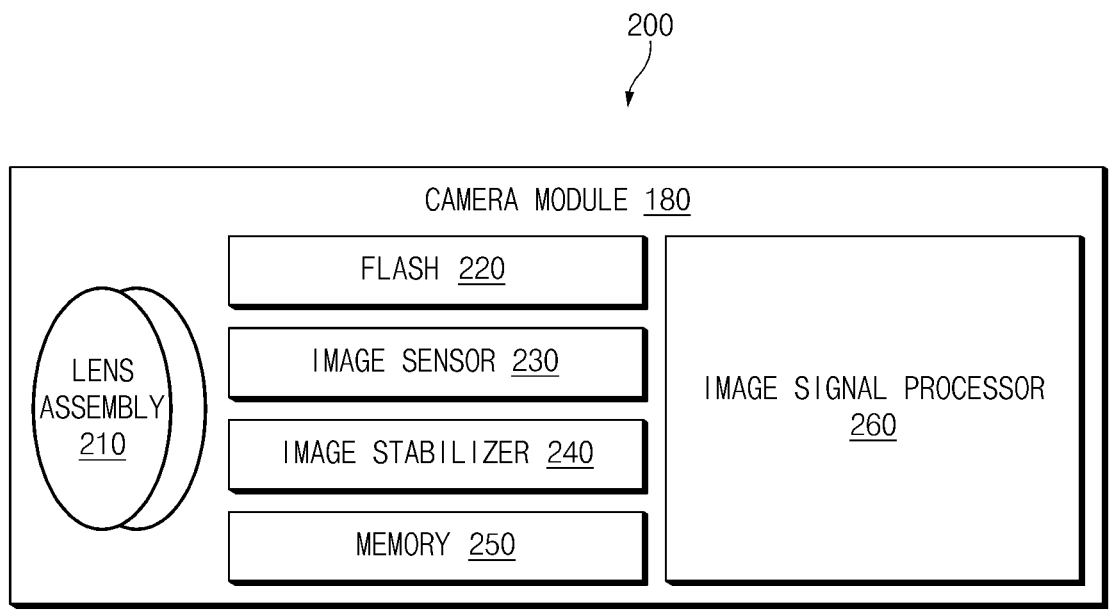
FIG. 2 is a block diagram illustrating a camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
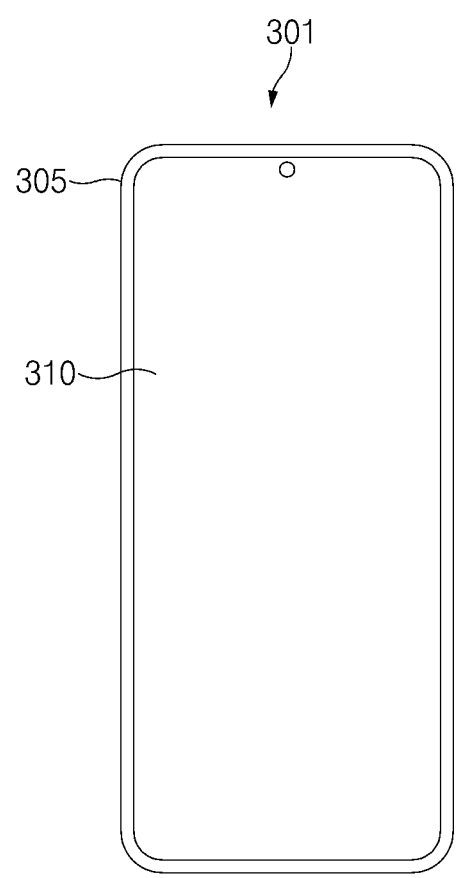
FIGS. 3A and 3B illustrate an electronic device including a camera module according to various embodiments.
Figure 3B:
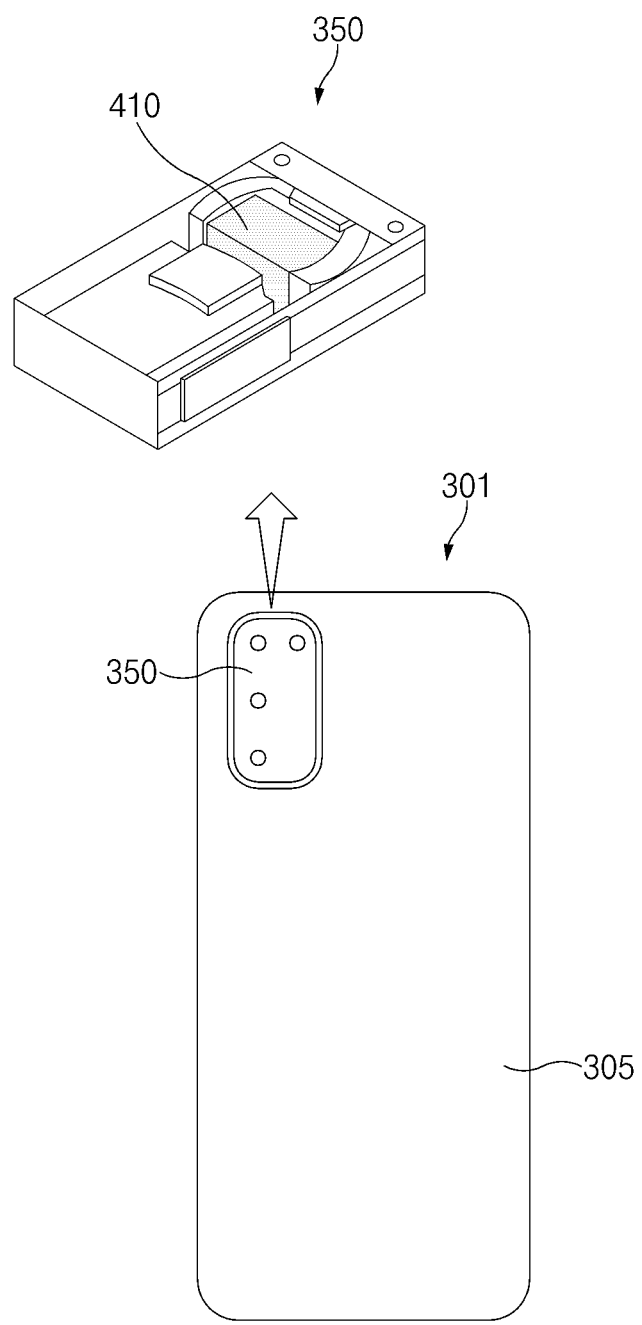

FIGS. 3A and 3B illustrate an electronic device including a camera module according to various embodiments. It is illustratively shown in FIG. 3B that an electronic device 301 includes a folded camera module 350, but not limited thereto.

Referring to FIGS. 3A and 3B, an electronic device 301 (e.g., an electronic device 101 of FIG. 1) may include a body part (or a housing) 305, a display 310 (e.g., a display device 160 of FIG. 1), and the folded camera module 350 (e.g., a camera module 180 of FIG. 1 or 2).

The body part (or the housing) 305 may mount the display 310 and the folded camera module 350. The body part 305 may include various components, for example, a processor (e.g., a processor 120 of FIG. 1), a memory (e.g., a memory 130 of FIG. 1), communication circuitry (e.g., a communication module 190 of FIG. 1), a printed circuit board, or a battery (e.g., a battery 189 of FIG. 1), for driving the electronic device 301 therein.

The display 310 may display various pieces of content, such as text or an image, on a first surface (e.g., a front surface) of the body part 305. The display 310 may include a plurality of layers. For example, the display 310 may include a glass panel, a touch panel, or a display panel.

At least a part of the folded camera module (or a folded camera structure) 350 may be exposed towards a second surface of the body part 305 (e.g., a rear surface, a surface where the display 310 does not output content, or a surface where a back cover is mounted). For example, a flash or a sensor unit of the folded camera module 350 may be exposed to the outside of the body part 305. It is illustratively shown in FIG. 3B that the camera module 350 is a rear camera, but not limited thereto. For example, the folded camera module 350 may be a front camera which is disposed in the same direction as the display 310.

According to various embodiments, the folded camera module 350 may include a prism (or a reflection mirror) 410 therein. The prism 410 may change a path of light introduced into the folded camera module 350.

According to various embodiments, the folded camera module 350 may include an optical splitter (not shown) (refer to FIG. 4) and a plurality of image sensors (not shown) (refer to FIG. 4) therein. Light reflected from the prism 410 may be split by the optical splitter to be introduced into the plurality of image sensors.

Figure 4:
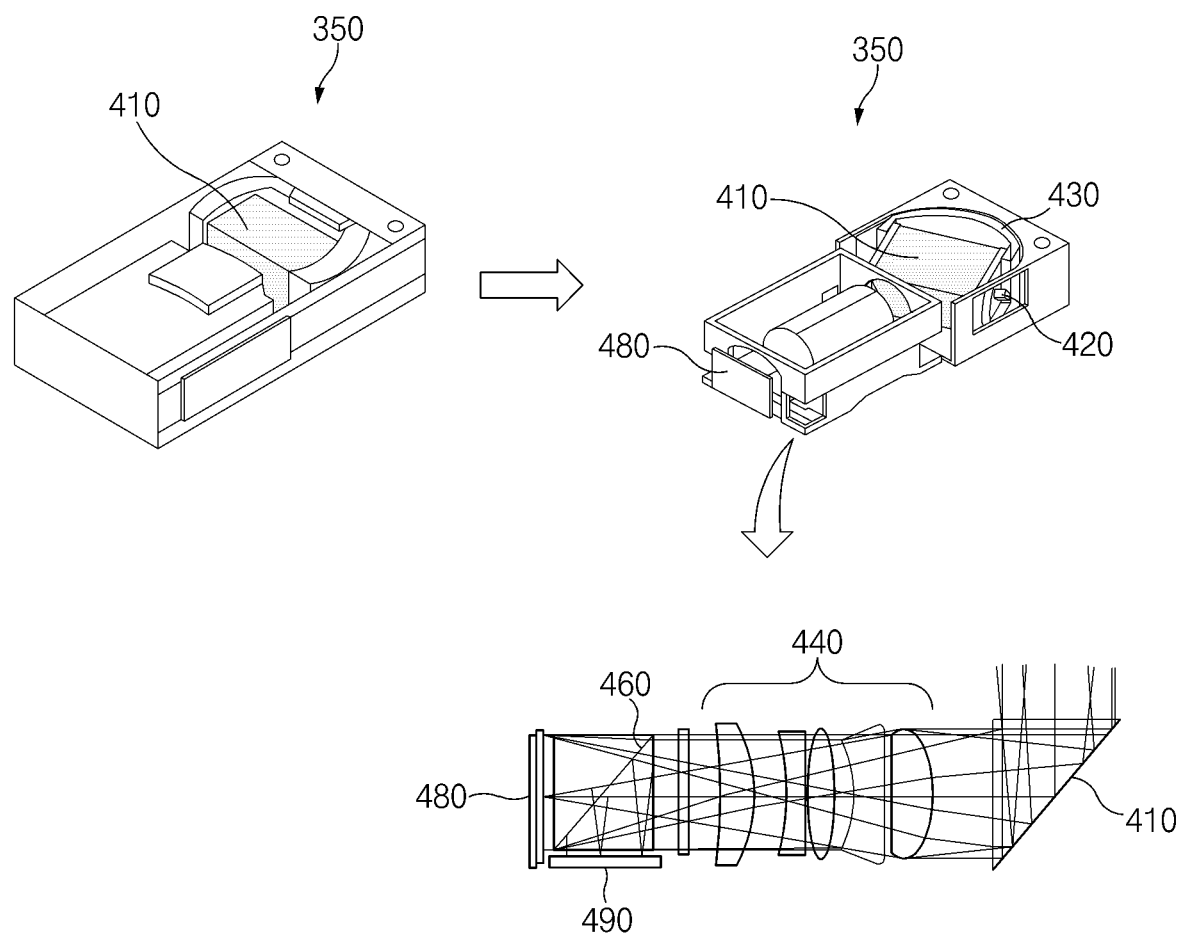
FIG. 4 illustrates a structure of a folded camera module according to various embodiments.

FIG. 4 illustrates a structure of a folded camera module according to various embodiments.

Referring to FIG. 4, the folded camera module 350 may include a prism 410, a driving part 420, a magnetic body 430, a lens part 440, an optical splitter (or a beam splitter) 460, a first image sensor 480, and a second image sensor 490. For example, when the folded camera module 350 is a telephoto camera, it is possible to ensure distances between the lens part 440 and the image sensors 480 and 490 and it may be easy to insert the optical splitter 460. When the lens part 440 is a high magnification telephoto zoom lens, an FBL (a distance from the last lens to the image sensor) may be relatively long and an arrangement space of the optical splitter 460 may be ensured.

The prism 410 may operate as a reflection mirror which changes a path of light introduced into the folded camera module 350. Light reflected from the prism 410 may pass through the lens part 440 to be introduced into the optical splitter 460.

The driving part 420 may rotate the prism 410 in a first direction (e.g., a yaw direction) or a second direction (e.g., a pitch direction). The driving part 420 may operate according to a control signal of a processor (e.g., a processor 120 of FIG. 1) or an image signal processor (e.g., an image signal processor 260 of FIG. 2) included in the folded camera module 350.

The magnetic body 430 may move together depending on rotation of the prism 410. Magnetic flux around the prism 410 may change according to movement of the magnetic body 430.

The lens part 440 may be disposed between the prism 410 and the optical splitter 460. The lens part 440 may deliver light reflected from the prism 410 to the optical splitter 460. For example, when the lens part 440 is a high magnification telephoto zoom lens, an FBL (a distance from the last lens to the image sensor) may be relatively long and an arrangement space of the optical splitter 460 may be ensured.

The optical splitter 460 may split light delivered from the lens part 440 to deliver the light to the first image sensor 480 or the second image sensor 490. For example, the optical splitter 460 may be a prism, an inclined plane of which faces the lens part 440 and transmits a portion of light delivered from the lens part 440. Visible light incident to the optical splitter 460 may be split into two by the inclined plane of the prism. For example, light transmitted through the optical splitter 460 may be incident to the first image sensor 480 implemented in a two-photo diode (hereinafter, 2PD) manner (that is, two photo diodes are arranged in one pixel in the first image sensor 480), and light reflected from the optical splitter 460 may be incident to a single PD-type second image sensor 490 (that is, one photo diode is arranged in one pixel in the second image sensor 490). For another example, the optical splitter 460 may be in the form of a plate including an inclined plane. Light transmitted through the optical splitter 460 in the form of the plate of the inclined plane may be incident to the first image sensor 480 implemented in the 2PD manner, and light reflected from the optical splitter 460 may be incident to the single PD-type second image sensor 490.

The first image sensor 480 may include a plurality of pixels implemented in the 2PD manner. The first image sensor 480 may convert light passing through the optical splitter 460 into an electronic image signal. The first image sensor 480 may read out electronic image data according to the photoelectric conversion effect, which is recorded in each pixel.

According to various embodiments, a sensing surface of the first image sensor 480 may be disposed in a direction facing the lens part 440 (or a direction facing a side surface of an electronic device (an electronic device 101 of FIG. 1 or an electronic device 301 of FIGS. 3A and 3B)). When the thickness of the electronic device 101 or 301 is limited (when the electronic device 101 or 301 has a relatively thin thickness), the first image sensor 480 having a relatively large pixel in the 2PD manner may have limited resolution (the limited number of pixels). For example, when the first image sensor 480 and the second image sensor 490 have the same size, resolution of the 2PD-type first image sensor 480 may be lower than resolution of the single PD-type second image sensor 490. For example, when the first image sensor 480 and the second image sensor 490 have the same size, the resolution of the first image sensor 480 may be 12 Mpx (4000*3000) and the resolution of the second image sensor 490 may be 48 Mpx (8000*6000).

The second image sensor 490 may include a plurality of pixels implemented in the single PD manner. The second image sensor 490 may convert light reflected from the optical splitter 460 into an electronic image signal. The second image sensor 490 may read out electronic image data according to the photoelectric conversion effect, which is recorded in each pixel.

According to various embodiments, a sensing surface of the second image sensor 490 may be disposed in a direction perpendicular to an optical axis of the lens part 440 (or a direction facing a front surface or a rear surface of the electronic device 101 or 301).

A pixel of the second image sensor 490 may be smaller in size than a pixel of the first image sensor 480. Thus, the single PD-type second image sensor 490 may be higher in resolution than the 2PD-type first image sensor 480. For example, when the first image sensor 480 and the second image sensor 490 have the same size, the resolution of the first image sensor 480 may be 12 Mpx (4000*3000) and the resolution of the second image sensor 490 may be 48 Mpx (8000*6000).

Figure 6:
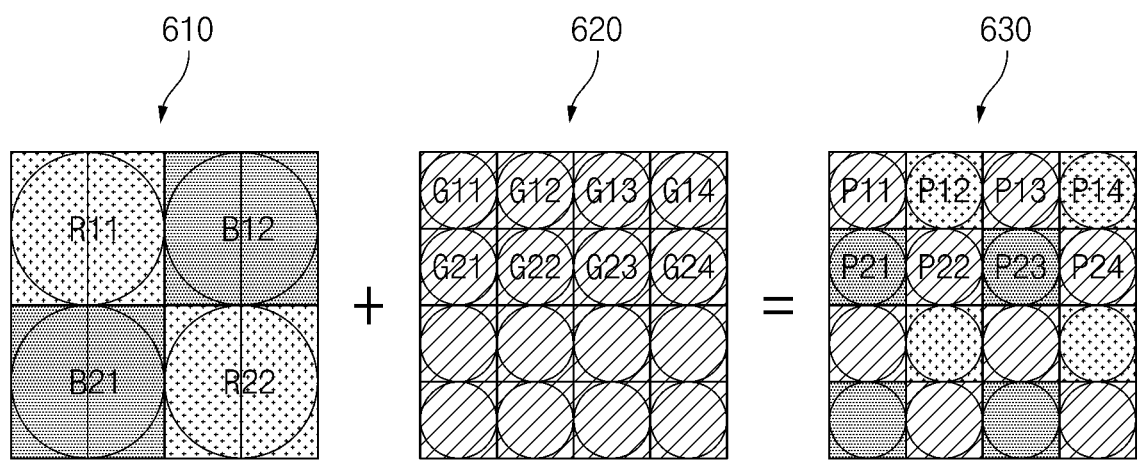
FIG. 6 illustrates synthesis of first image data and second image data according to various embodiments.

According to various embodiments, the processor (e.g., the processor 120 of FIG. 1) or the image signal processor (e.g., the image signal processor 260 of FIG. 2) included in the folded camera module 350 may synthesize first image data obtained by the first image sensor 480 and second image data obtained by the second image sensor 490 in various manners (refer to FIG. 6). The processor 120 or the image signal processor 260 may perform a specified function such as auto focus (AF) or may correct an image displayed to a user, using at least one of the first image data, the second image data, or the combined image data.

According to various embodiments, the arrangement of the 2PD-type first image sensor 480 and the arrangement of the single PD-type second image sensor 490 may be exchanged with each other. For example, the 2PD-type first image sensor 480 may be disposed in a direction perpendicular to an optical axis of the lens part 440 to image light reflected from the optical splitter 460. The single PD-type second image sensor 490 may be disposed in a direction facing the lens part 440 to image light passing through the optical splitter 460.

Figure 5A:
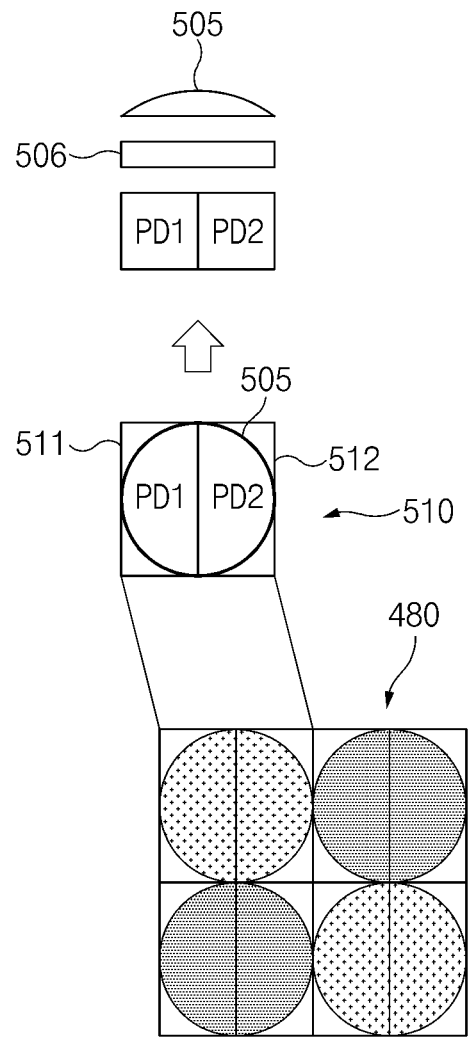
FIGS. 5A, 5B, and 5C illustrate a pixel structure in a first image sensor and a second image sensor according to various embodiments.
Figure 5B:
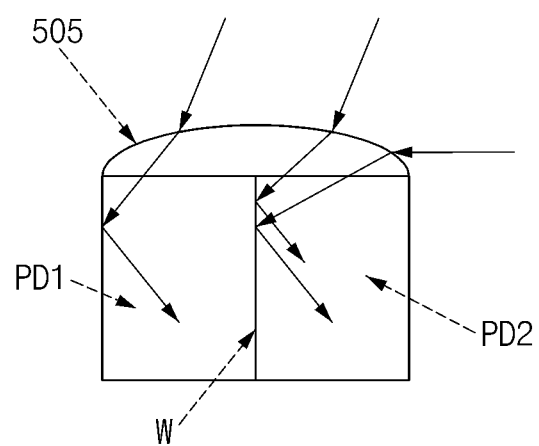
Figure 5C:
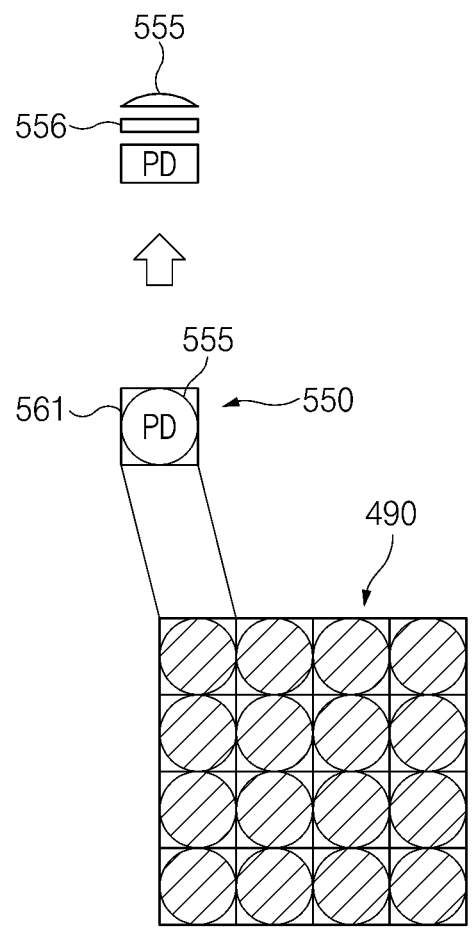

FIGS. 5A, 5B, and 5C illustrate a pixel structure in a first image sensor and a second image sensor according to various embodiments.

Referring to FIG. 5A, a first image sensor 480 may include a plurality of pixels implemented in a 2PD manner. One pixel 510 among the plurality of pixels may include a microlens 505, a color filter 506, a first PD (or a first sub-pixel) (PD1) 511, and a second PD (or a second sub-pixel) (PD2) 512. The pixel 510 included in the first image sensor 480 may be larger in size than a pixel 550 included a second image sensor 490 (e.g., two times larger). When the first image sensor 480 and the second image sensor 490 are the same in size, the first image sensor 480 may be lower in resolution than the second image sensor 490. For example, when the first image sensor 480 and the second image sensor 490 have the same size, the resolution of the first image sensor 480 may be 12 Mpx (4000*3000) and the resolution of the second image sensor 490 may be 48 Mpx (8000*6000).

The microlens 505 may cover the first PD 511 and the second PD 512. The microlens 505 may adjust a path of an incident light such that light incident from the outside may arrive at the first PD 511 and the second PD 512.

The color filter 506 may be disposed between the microlens 505 and PDs (the first PD 511 and the second PD 512) to pass light of a wavelength range corresponding to one of a first color (e.g., red) and a second color (e.g., blue). For example, the color filter 506 may allow the light of the wavelength range corresponding to one of a red color or a blue color in light passing through the microlens 505 to arrive at the first PD 511 and the second PD 512 and may block light of a wavelength range of a green color.

Each of the first PD 511 and the second PD 512 may convert light passing through the microlens 505 and the color filter 506 into an electrical signal. As light introduced from the outside (e.g., light reflected from an object) may be refracted by the microlens 505, a progress path thereof may be changed. Light passing through the microlens 505 may be directly introduced into PDs, or may be reflected from a pixel wall W between the PDs to be introduced into the PDs.

According to various embodiments, when light reflected from the same point (or an adjacent point) of an external object is incident to the first PD 511 and the second PD 512, an optical path difference may be generated by the microlens 505 or the pixel wall W. Thus, a phase difference may occur between data of the first PD 511 and data of the second PD 512. The processor 120 or the image signal processor 260 may perform precise AF using the phase difference.

According to various embodiments, the first image sensor 480 may obtain first image data where a first color (e.g., red) and a second color (e.g., blue) intersect each other to be arranged. The processor 120 or the image signal processor 260 may perform a specified function (e.g., AF) based on the first image data.

Referring to FIG. 5C, the second image sensor 490 may include a plurality of single PD-type pixels. One pixel 550 among the plurality of pixels may include a microlens 555, a color filter 556, and a PD 561. The pixel 550 may include one PD 561. The pixel 550 included in the second image sensor 490 may be smaller in size than the pixel 510 included the first image sensor 480 (e.g., ½ times). When the first image sensor 480 and the second image sensor 490 are the same in size, the second image sensor 490 may be higher in resolution than the first image sensor 480 (e.g., four times higher).

The microlens 555 may cover the PD 561. The microlens 555 may adjust a path of an incident light such that light incident from the outside may arrive at the PD 561.

The color filter 556 may be disposed between the microlens 555 and the PD 561 and may pass light of a wavelength range corresponding to a third color (e.g., green). The color filter 556 may allow light of a wavelength range corresponding to a green color in light passing through the microlens 555 to arrive at the PD 561 and may block light of a wavelength range corresponding to a red color or a blue color.

The PD 561 may convert light passing through the microlens 555 and the color filter 556 into an electrical signal. As light introduced from the outside (e.g., light reflected from an object) may be refracted by the microlens 555, a progress path thereof may be changed.

According to various embodiments, the first image sensor 480 may obtain first image data where a first color (e.g., red) and a second color (e.g., blue) intersect each other to be arranged. The second image sensor 490 may obtain second image data configured with only the third color (e.g., green). The processor 120 or the image signal processor 260 may synthesize the first image data and second image data in various manners (refer to FIG. 6).

FIG. 6 illustrates synthesis of first image data and second image data according to various embodiments. FIG. 6 is illustrative, but not limited thereto. A scheme of synthesizing first image data 610 and second image data 620 may be variously applied.

Referring to FIG. 6, a first image sensor 480 may convert light passing through an optical splitter 460 into an electronic image signal to obtain the first image data 610. First color (e.g., red) data and second color (e.g., blue) data may intersect each other to be arranged in the first image data 610.

A second image sensor 490 may convert light reflected from the optical splitter 460 into an electronic image signal to obtain the second image data 620. Third color (e.g., green) data may be disposed in the entire region of the second image data 620.

For example, when the first image sensor 480 and the second image sensor 490 have the same size, the first image data 610 obtained by the 2PD-type first image sensor 480 may be lower in resolution than the second image data 620 obtained by the single PD-type second image sensor 490. For example, when a pixel size of the first image sensor 480 is 1.4 μm and when a pixel size of the second image sensor 490 is 0.7 μm, the first image data 610 may have resolution of 12 Mpx (4000*3000) and the second image data 620 may have resolution of 48 Mpx (8000*6000).

According to various embodiments, a processor (e.g., a processor 120 of FIG. 1) or an image signal processor (e.g., an image signal processor 260 of FIG. 2) included in the folded camera module 350 may synthesize the first image data 610 and the second image data 620 to generate combination image data 630. For example, the combination image data 630 may be an RGBG Bayer-patterned image.

According to an embodiment, the combination image data 630 may have the same resolution as the second image data 620.

For example, a green color pixel (e.g., P11, P13, P22, or P24) in the combination image data 630 may have the same value as a corresponding pixel (e.g., G11, G13, G22, or G24) of the second image data 620.

For example, some (e.g., P12) of red color pixels of the combination image data 630 may have the same value as corresponding pixels (e.g., R11) of the first image data 610. Some (e.g., P14) of red color pixels of the combination image data 630 may have the same value as a pixel (e.g., R11 or R22) adjacent to corresponding pixels of the first image data 610.

For example, some (e.g., P23) of blue color pixels of the combination image data 630 may have the same value as corresponding pixels (e.g., B12) of the first image data 610. Some (e.g., P21) of blue color pixels of the combination image data 630 may have the same value as a pixel (e.g., B12 or B21) adjacent to corresponding pixels of the first image data 610. The combination image data 630 may be displayed as a preview image or may be displayed as an image by means of a gallery app.

According to various embodiments, the processor (e.g., the processor 120 of FIG. 1) or the image signal processor (e.g., the image signal processor 260 of FIG. 2) may reflect a pixel (e.g., G12, G14, G21, or G23) corresponding to a red color pixel or a blue color pixel of the combination image data 630 in the second image data 620 in a green color pixel (e.g., P11, P13, P22, or P24) of the combination image data 630. For example, the processor or the image signal processor may replace data with much noise among green color pixels (e.g., P11, P13, P22, and P24) with adjacent pixels (e.g., G12, G14, G21, and G23) or may partially reflect the data with much noise in the adjacent pixels (e.g., G12, G14, G21, and G23).

According to various embodiments, the second image data 620 may have twice the sensitivity of a composite image 630. The processor (e.g., the processor 120 of FIG. 1) or the image signal processor (e.g., the image signal processor 260 of FIG. 2) included in the folded camera module 350 may improve low illumination performance of the combination image data 630 based on an analysis characteristic of the single color second image data 620.

An electronic device (e.g., an electronic device 101 of FIG. 1 or an electronic device 301 of FIGS. 3A and 3B) according to various embodiments may include a camera module (e.g., a camera module 180 of FIG. 1 or the folded camera module 350 of FIG. 3B), a memory (e.g., a memory 130 of FIG. 1), and a processor (e.g., a processor 120 of FIG. 1) electrically connected with the camera module and the memory. The camera module (e.g., the camera module 180 of FIG. 1 or the folded camera module 350 of FIG. 3B) may include a lens part, a first image sensor (e.g., a first image sensor 480 of FIG. 4) having a two-photo diode (PD) pixel of a first color and a second color, a second image sensor (e.g., a second image sensor 490 of FIG. 4) having a pixel of a third color, and an optical splitter (e.g., an optical splitter 460 of FIG. 4) for splitting light introduced through the lens part. The optical splitter (e.g., the optical splitter 460 of FIG. 4) may pass and input a first portion of the light introduced through the lens part to the first image sensor. The optical splitter (e.g., the optical splitter 460 of FIG. 4) may reflect and input a second portion of the light introduced through the lens part to the second image sensor. The processor (e.g., the processor 120 of FIG. 1) may combine first image data obtained by means of the first image sensor (e.g., the first image sensor 480 of FIG. 4) and second image data obtained by means of the second image sensor (e.g., the second image sensor 490 of FIG. 4) to generate third image data and may perform a specified function using at least one of the first image data, the second image data, or the generated third image data.

According to various embodiments, a sensing surface of the first image sensor (e.g., the first image sensor 480 of FIG. 4) may face a first direction, and a sensing surface of the second image sensor (e.g., the second image sensor 490 of FIG. 4) may face a second direction perpendicular to the first direction.

According to various embodiments, the first direction may be a direction facing a side surface of the electronic device (e.g., the electronic device 101 of FIG. 1 or an electronic device 301 of FIGS. 3A and 3B), and the second direction may be a direction facing a display (e.g., a display device 160 of FIG. 1 or a display 310 of FIG. 3A) or a back cover of the electronic device (e.g., the electronic device 101 of FIG. 1 or an electronic device 301 of FIGS. 3A and 3B).

According to an embodiment, the first direction may be a direction facing the lens part.

According to various embodiments, the first direction may be a direction facing a display (e.g., a display device 160 of FIG. 1 or a display 310 of FIG. 3A) or a back cover of the electronic device (e.g., the electronic device 101 of FIG. 1 or an electronic device 301 of FIGS. 3A and 3B), and the second direction may be a direction facing a side surface of the electronic device (e.g., the electronic device 101 of FIG. 1 or an electronic device 301 of FIGS. 3A and 3B).

According to various embodiments, the first image data may have lower resolution than the second image data.

According to various embodiments, the third image data may have the same resolution as the second image data.

According to various embodiments, the processor (e.g., the processor 120 of FIG. 1) may correct the third image data based on an analysis characteristic of the second image data.

According to various embodiments, the processor (e.g., the processor 120 of FIG. 1) may determine a value of a first type pixel (or a first pixel) of the first color in the third image data based on a value of a pixel of a position corresponding to the first type pixel or a pixel adjacent to the position in the first image data.

According to various embodiments, the processor (e.g., the processor 120 of FIG. 1) may determine a value of a second type pixel (or a second pixel) of the second color in the third image data based on a value of a pixel of a position corresponding to the second type pixel or a pixel adjacent to the position in the first image data.

According to various embodiments, the processor (e.g., the processor 120 of FIG. 1) may determine a value of a third type pixel (or a third pixel) of the third color in the third image data based on a value of a pixel of a position corresponding to the third type pixel in the second image data.

According to various embodiments, the first image sensor (e.g., the first image sensor 480 of FIG. 4) may be larger in pixel size than the second image sensor (e.g., the second image sensor 490 of FIG. 4).

According to various embodiments, the camera module (e.g., the camera module 180 of FIG. 1 or the folded camera module 350 of FIG. 3B) may further include a first prism (e.g., a prism 410 of FIG. 4) and may input light reflected from the first prism (e.g., the prism 410 of FIG. 4) to the lens part.

According to various embodiments, the optical splitter (e.g., the optical splitter 460 of FIG. 4) may be a second prism, an inclined plane of which faces the lens part or the second image sensor (e.g., the second image sensor 490 of FIG. 4).

According to various embodiments, the optical splitter (e.g., the optical splitter 460 of FIG. 4) may be in the form of a plate including an inclined plane.

According to various embodiments, the lens part may be disposed between the first prism and the optical splitter (e.g., the optical splitter 460 of FIG. 4).

According to various embodiments, the camera module (e.g., the camera module 180 of FIG. 1 or the folded camera module 350 of FIG. 3B) may be a telephoto camera, and the lens part may have a zoom magnification above a specified magnification.

According to various embodiments, the function may be auto focus (AF). The processor (e.g., the processor 120 of FIG. 1) may perform the auto focus (AF) based on a phase difference in data obtained from the 2PD pixel of the first image sensor (e.g., the first image sensor 480 of FIG. 4).

According to various embodiments, the electronic device (e.g., the electronic device 101 of FIG. 1 or the electronic device 301 of FIGS. 3A and 3B) may further include a display (e.g., a display device 160 of FIG. 1 or a display 310 of FIG. 3A). The processor (e.g., the processor 120 of FIG. 1) may display an image on the display (e.g., the display device 160 of FIG. 1 or the display 310 of FIG. 3A) based on the third image data.

According to various embodiments, the third image data may be an RGBG Bayer-patterned image.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a camera module;
   a memory; and
   a processor electrically connected with the camera module and the memory,
   wherein the camera module includes:
   a lens part;
   a first image sensor including a first pixel of a first color and a second pixel of a second color, wherein the second pixel is at a position adjacent to the first pixel;
   a second image sensor including a third pixel of a third color, wherein four pixels including the third pixel corresponds to the first pixel; and
   an optical splitter configured to:
      provide a first portion of a light introduced through the lens part to the first image sensor; and
      provide a second portion of the light introduced through the lens part to the second image sensor, and
   wherein the processor is configured to:
   obtain first image data including a first value of the first pixel and a second value of the second pixel from the first image sensor;
   obtain second image data including a third value of the third pixel from the second image sensor; and
   generate combined image data including four pixels using at least one of the first value, the second value and the third value, and
   wherein a value of the second color among the four pixels of the combined image data is generated using the second value of the second pixel at a position adjacent to the first pixel.

2. The electronic device of claim 1, wherein a sensing surface of the first image sensor faces a first direction, and
   wherein a sensing surface of the second image sensor faces a second direction perpendicular to the first direction.

3. The electronic device of claim 2, further comprising a display and a back cover,
   wherein the second direction is a direction facing the display or the back cover of the electronic device.

4. The electronic device of claim 2, wherein the first direction is a direction facing the lens part.

5. The electronic device of claim 2, further comprising a display and a back cover,
   wherein the first direction is a direction facing the display or the back cover of the electronic device.

6. The electronic device of claim 1, wherein the first image data has a lower resolution than the second image data.

7. The electronic device of claim 1, wherein the combined image data has the same resolution as the second image data.

8. The electronic device of claim 1, wherein the processor is further configured to correct the combined image data based on an analysis characteristic of the second image data.

9. The electronic device of claim 1, wherein the first image sensor is a larger pixel size than the second image sensor.

10. The electronic device of claim 1, wherein the camera module further includes a first prism and is configured to provide a light reflected from the first prism to the lens part.

11. The electronic device of claim 10, wherein the optical splitter includes a second prism, and
    wherein an inclined plane of the second prism faces the lens part or the second image sensor.

12. The electronic device of claim 10, wherein the optical splitter is in a form of a plate including an inclined plane.

13. The electronic device of claim 10, wherein the lens part is provided between the first prism and the optical splitter.

14. The electronic device of claim 1, wherein the camera module is a telephoto camera, and
    wherein the lens part has a zoom magnification above a specified magnification.

15. The electronic device of claim 1,
    wherein the processor performs auto focus (AF) using at least one of the first image data, the second image data, or the combined image data.

16. The electronic device of claim 1, further comprising:
    a display,
    wherein the processor is further configured to control the display to display an image based on the combined image data.

17. The electronic device of claim 1, wherein the combined image data is an RGBG Bayer-patterned image.

* * * * *